Figure 1:
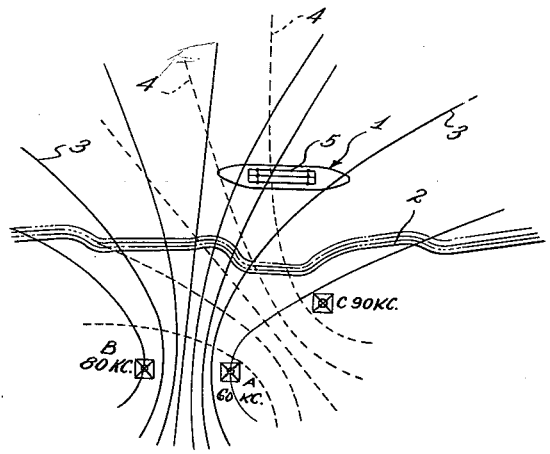

April 10, 1951

W. J. O'BRIEN 2,548,233

RADIO RECEIVING APPARATUS

Original Filed Aug. 27, 1945

INVENTOR.
WILLIAM J. O'BRIEN
BY
Walter F. Huntley
Attorney

Patented Apr. 10, 1951

2,548,233

UNITED STATES PATENT OFFICE 2,548,233

RADIO RECEIVING APPARATUS

William J. O'Brien, London, England, assignor to The Decca Record Company, Limited, London, England, a corporation of Great Britain Original application August 27, 1945, Serial No. 612,991, now Patent No. 2,500,200, dated March 14, 1950. Divided and this application February 10, 1949, Serial No. 75,681. In Great Britain August 23, 1945

8 Claims. (Cl. 343—105)

My invention relates to a radio receiving apparatus and has particular reference to a receiving apparatus including an antenna coupling circuit a multiple channel receiver operating with suitable phase displacement indicators for indicating the phase relationships among synchronized radio frequency transmissions from spaced antennae and at unlike but related frequencies.

This application is a division of my copending application Serial No. 612,991, filed August 27, 1945, and entitled "Multiple Channel Radio Frequency Receiver," now Patent No. 2,500,200 issued March 14, 1950.

As is disclosed in my copending application Serial No. 612,987, filed August 27, 1945, and entitled "Navigation System," now abandoned, it is possible, by means of synchronized radio frequency transmissions from spaced points and at unlike but related frequencies, to establish an equi-phase displacement coordinate system which may be used for guiding the navigation of vehicles of various types. The vehicles to be guided are equipped with receiving apparatus for receiving the synchronized transmissions and for indicating the relative phase relationships among the transmissions.

In the use of apparatus of this character it is essential that spurious phase shifts within the apparatus either be eliminated or compensated so that the accuracy of the phase indication is not impaired. One of the chief sources of phase error in the commercial use of a system of this character is found in the capacity of the receiving antenna which is subject to change as the result of variations in external conditions, such as temperature and wind conditions.

Since the receiving apparatus comprises, in effect, a plurality of receivers each tuned to different frequencies, the compensation or correction which would be effective for one channel is not of the proper magnitude to compensate for phase shifts in the other channels. It is possible for a given installation to so adjust the input characteristics of each of the channels as to compensate for the changes in antenna capacity. This, however, is not a feasible arrangement from a practical standpoint since it requires each receiving apparatus to be constructed to fit a particular antenna installation. Antenna installations vary widely in their characteristics from ships to ships and from ship to aircraft. It is thus virtually impossible, by the ordinary procedures known prior to this invention, to compensate a multiple channel receiver for operation on a plurality of frequencies in such a way that changes in antenna capacity will not produce unlike phase shifts in the output signal from each channel.

It is therefore an object of the present invention to provide an antenna coupling circuit for use with multiple channel radio frequency receiving apparatus which introduces into each channel, as a result of a given change in antenna capacity, a phase shift which is proportional to the frequency of such channel.

It is also an object of this invention to provide an antenna coupler of the character set forth in the preceding paragraph for each channel having characteristic parameters comprising capacity, coefficient of coupling, and "Q" in which two of said parameters are made equal among the plurality of channels and in which the magnitude of the third of said parameters is a function of the frequency accepted by the corresponding channel.

It is an additional object of this invention to provide an antenna coupler of the character set forth in the preceding paragraph in which the capacities and coefficients of coupling are made equal, and in which the respective "Q's" are made proportional to the frequency to which the corresponding channel is tuned.

Figure 2:
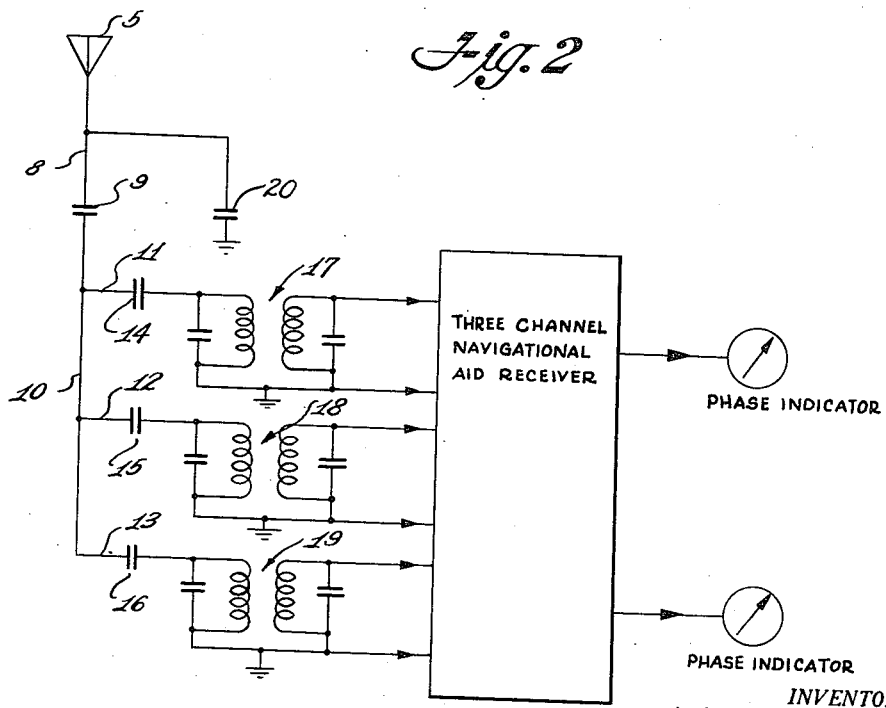

Other objects and advantages of my invention will be apparent from a study of the following specifications, read in connection with the accompanying drawings, wherein:

Fig. 1 is a schematic drawing representing the elements of a radio frequency navigation system of the character disclosed in my aforementioned copending application Serial No. 612,987 with which the radio receiving apparatus and antenna coupling circuit to be described hereinafter is partcularly adapted for use; and Fig. 2 is a schematic diagram illustrating the construction of the receiving apparatus and showing the antenna coupling circuit forming the subject-matter of this divisional application.

Referring to the drawings, I have illustrated in Fig. 1 a radio frequency navigation system of a type with which the radio receiving apparatus and antenna coupling circuit of this invention may be used. As is disclosed in my aforementioned copending application Serial No. 612,987, the transmission apparatus may include three radio frequency transmitters A, B and C. In the event the apparatus is to be used for guiding the navigation of sea-going vessels, such as is represented in Fig. 1 by the outline I, the transmitters A, B and C may be placed at or near the shoreline 2. They are spaced from each other at predetermined distances and are so operated at harmonically related frequencies as to maintain a fixed multiple phase relationship among the three transmissions. As an example of the harmonically related frequencies which may be used, the invention herein is described with reference to the transmission of signals having frequencies of 60, 80 and 90 kilocycles, respectively. It will be understood, however, that the invention is not limited to the three frequencies stated, but is directed to the use of signals bearing a harmonic relationship, such as is exemplified by the three frequencies selected for illustration.

The three radio frequency fields produced by the operation of transmitters A, B and C interact to establish overlapping and intersecting field patterns, such as are represented by the lines 3 and 4 in Fig. 1, each of which said lines represent the locus of a given multiple phase relationship between the signals emanating from transmitters A and B and between the signals emanating from transmitters A and C, respectively.

The navigation grid thus established is utilized for aiding in the navigation of mobile vehicles, such as the ship 1, and to this end the ship is provided with a receiving antenna 5 coupled through an antenna coupling circuit (Fig. 2) to be described in detail hereinafter to a three-channel navigational aid receiver (Fig. 2). This receiver operates to measure the phase relationships of the received signals and by means of suitable phase indicators operates to provide a visual indication of the measured phase relationships. The observed indications may then be plotted on a suitably prepared chart to fix the position of the mobile vehicle.

It will be understood that the phase relationship between any pair of signals must be measured at like frequencies and the receiving apparatus operates to bring the received signals to frequency equality by means of frequency conversion apparatus. Thus the phase relation between the 60 and 80 kilocycle signals is measured at a frequency of 240 kilocycles by multiplying the 60 kilocycle signal by four and multiplying the 80 kilocycle signal by three. Similarly, the phase relation between the 60 and 90 kilocycle signal is measured at a phase comparison frequency of 180 kilocycles obtained by multiplying the 60 kilocycle signal by three and the 90 kilocycle signal by two.

It will be apparent to those skilled in this art that any phase shift in a given received signal is multiplied in magnitude by an amount equal to the frequency multiplication to which that signal is subjected for the purpose of producing the phase comparison frequency above mentioned. It thus follows that if phase shifts resulting from changes in antenna capacity are to be compensated, these changes in capacity must produce in each channel a phase shift which is proportional to the frequency to which that channel is tuned. When those respective frequencies are multiplied up to equality in the manner described, these proportional phase changes are likewise multiplied to equality so that the phase difference between the two signals of each pair of phase comparison frequencies is precisely zero.

This proportionality of phase shift resulting from a change in antenna capacity is provided by the coupling circuit which is illustrated in detail in Fig. 2. As is shown therein, the antenna 5 is connected as by means of a lead-in conductor 8 and coupling condenser 9 to a feeder conductor 10. From the feeder conductor 10 branch circuits 11, 12 and 13 are connected, respectively, through coupling condensers 14, 15 and 16 to double-tuned input transformers 17, 18 and 19, each of the tuned transformers consisting of inductively coupled primary and secondary windings each shunted by suitable tuning condensers. The low voltage ends of each of the windings are interconnected and returned to ground as shown in the drawings.

The transformer 18 is tuned to the frequency of the transmissions from station A (in the assumed example it is tuned to 60 kilocycles). The transformers 17 and 19 are, respectively, tuned to the transmissions from stations C and B (90 and 80 kilocycles).

It will be observed that in each of the branch circuits 11, 12 and 13 between the feeder conductor 10 and the three-channel navigational aid receiver there is interposed electrical instrumentalities having characteristic parameters of capacity, coefficients of coupling and "Q." (The term "Q" is used to define the ratio of shunt resistance to reactance for the complete transformer, including both primary and secondary windings.) I have found that by making two of these three parameters equal among the three branch circuits and by selecting the magnitude of the remaining parameter as a function of the frequency of the signal passed by the associate branch circuit, the phase change in each circuit at the input to the three-channel navigational aid receiver resulting from a change in antenna capacity is directly proportional to the frequency of the signal passed by each branch circuit. Such an arrangement produces a complete compensation for such phase change as was explained in the preceding paragraphs.

As a matter of convenience, I prefer to make all of the tuning capacities equal and to make all of the coupling capacities 14, 15 and 16 equal, to make the coefficients of coupling of the transformers 17, 18 and 19 equal, and to adjust the "Q's" of these transformers to be proportional to the frequency to which each transformer is tuned. I have found that of the three parameters which are subject to adjustment, the adjustment is most easily accomplished by selecting for equal values the capacities and coefficients of coupling and adjusting the "Q's" to be proportional to frequency.

In addition to the coupling condenser 9, I prefer to by-pass the antenna to ground through a by-pass condenser 20. These condensers 9 and 20 are inserted in the circuit as a capacity potentiometer type of attenuator to limit to reasonable values the effect of changes in antenna capacity. This limitation is, of course, achieved at a corresponding sacrifice in the voltage applied to the input of the three-channel navigational aid receiver. This loss, however, may be easily recovered by suitably increasing the gain of the receiver.

The phase compensating antenna coupling circuit just described is substantially limited in its practical application to frequencies less than two megacycles because at higher frequencies the resistance of the antenna and the lead-in circuit is no longer negligible. Furthermore, at frequencies of the order of magnitude of 100 kilocycles, the antenna installation must be carefully made and the antenna must be well insulated to keep the antenna leakage at a minimum.

The leakage resistance should exceed 100,000 ohms.

As an example of the magnitude of the electrical components which may be used in this circuit and with reference to a circuit intended to operate at a frequency of the order of magnitude of 100 kilocycles, I prefer to use tuning condensers having a capacity of 400 micro-microfarads, coupling condensers 14—16 having a capacity of 200 micro-microfarads and a by-pass condenser 20 having a capacity of 60 micro-microfarads. A coupling coefficient of the order of magnitude of seventy (70%) percent is preferred and the transformer coils are all of the low "Q" type so that a straight line phase versus frequency response is obtained in the transformers over a reasonably wide range. As explained hereinbefore, the "Q's" of the individual transformers are adjusted to be proportional to the frequency to which each of the transformers are tuned.

From the foregoing it will be observed that I have provided a radio receiving apparatus in which the receiving aerial is coupled to a multiple channel radio frequency receiver adapted to operate phase measuring equipment in which the coupling of the receiving apparatus to the aerial is effected by means of a novel coupling circuit operating to produce, in response to changes in antenna capacity, phase shifts in each of the receiver channels proportional to the frequency of the signal amplified by the associated channel.

It will also be observed that with the coupling circuit hereinbefore described, it is possible to compensate a multiple channel radio frequency receiver for changes in aerial capacity without requiring adjustment of the device to the individual aerial installation, thus making possible the manufacture of a standardized receiving apparatus with the complete assurance that that apparatus will operate without difficulty with substantially any receiving antenna installation.

While I have shown and described the preferred embodiment of my invention, I do not desire to be limited to the details of construction described herein, except as defined in the appended claims.

I claim:

1. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and a coupling means interposed between said antenna and said receiver responsive to changes in capacity of said antenna for producing phase shifts in each of said signals proportional to the frequency of said signals.

2. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and phase compensating coupling means interposed between said antenna and said receiver, said coupling means comprising a coupling device for each of said channels having characteristic parameters of capacity, coefficient of coupling, and "Q", the magnitudes of two of said parameters being equal among said devices, and the magnitudes of the remaining one of said parameters being a function of the frequency of the signal amplified by the channel associated therewith, whereby phase shifts in each signal resulting from changes in capacity of said antenna are proportional to the frequency of the corresponding signal.

3. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and phase compensating coupling means interposed between said antenna and said receiver, said coupling means comprising a coupling device for each of said channels having a given coefficient of coupling and characteristic parameters of capacity and "Q," the magnitudes of said coefficients of coupling and one of said parameters being equal among said devices, and the magnitudes of said other parameter being proportional to the frequency of the signal amplified by the channel associated therewith, whereby phase shifts in each signal resulting from changes in capacity of said antenna are proportional to the frequency of the corresponding signal.

4. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and phase compensating coupling means interposed between said antenna and said receiver, said coupling means comprising a coupling device for each of said channels having characteristic parameters of capacity, coefficient of coupling, and "Q," the magnitudes of said capacity and coefficient of coupling being equal among said devices, and the magnitudes of said "Q's" being proportional to the frequency of the signal amplified by the channel associated therewith, whereby phase shifts in each signal resulting from changes in capacity of said antenna are proportional to the frequency of the corresponding signal.

5. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and a coupling means connecting each of said channels to said antenna comprising a coupling capacity and a double-tuned transformer tuned to the frequency of the signal to be amplified by the associated channel, said capacities and the coefficients of coupling of said transformers being equal among said channels, and the "Q's" of said transformers being proportional respectively to the frequencies to which said transformers are tuned, whereby phase shifts in each signal resulting from changes in capacity of said antenna are proportional to the frequency of the corresponding signal.

6. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and a coupling means connecting each of said channels to said antenna comprising a coupling capacity and a double-tuned transformer connected in series between said antenna and the associated channel, said transformer comprising inductively coupled primary and secondary windings each tuned by a shunt condenser to the frequency to be amplified by the associated channel, said coupling capacities, the capacities of said shunt condensers, and the coefficients of coupling of transformers being equal among said channels, and the "Q's" of said transformers being proportional respectively to the frequencies to which said transformers are tuned, whereby phase shifts in each signal resulting from changes in capacity of said antenna are proportional to the frequency of the corresponding signal.

7. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; and a coupling means connecting each of said channels to said antenna comprising a coupling capacity and a double-tuned transformer connected in series between said antenna and the associated channel, said transformer comprising inductively coupled primary and secondary windings each tuned by a shunt condenser to the frequency to be amplified by the associated channel, each of said devices having characteristic parameters of capacity, coefficient of coupling, and "Q," the magnitudes of two of said parameters being equal among said devices, and the magnitudes of the remaining one of said parameters being a function of the frequency of the signal amplified by a channel associated therewith, whereby phase shifts in each signal resulting from changes in capacity of said antenna are proportional to the frequency of the corresponding signal.

8. In a radio receiving apparatus, the combination of: a receiving antenna; a radio frequency receiver having a plurality of amplifying channels for respectively amplifying received signals of unlike but harmonically related frequencies and including means for measuring and indicating the multiple phase relations among said received signals; a coupling means connecting each of said channels to said antenna comprising a coupling capacity and a double-tuned transformer connected in series between said antenna and the associated channel, said transformer comprising inductively coupled primary and secondary windings each tuned by a shunt condenser to the frequency to be amplified by the associated channel, said coupling capacities, the capacities of said shunt condensers, and the coefficients of coupling of transformers being equal among said channels, and the "Q's" of said transformers being proportional respectively to the frequencies to which said transformers are tuned; a series condenser between said antenna and said coupling condenser; and a shunt condenser connected between said series condenser and ground, whereby phase shifts in each signal resulting from changes in capacity of said antenna are proportional to the frequency of the corresponding signal.

WILLIAM J. O'BRIEN.

No references cited.